United States Patent
Lacy et al.

(10) Patent No.: US 9,849,510 B2
(45) Date of Patent: Dec. 26, 2017

(54) ARTICLE AND METHOD OF FORMING AN ARTICLE

(71) Applicant: GENERAL ELECTRIC COMPANY, Schenectady, NY (US)

(72) Inventors: Benjamin Paul Lacy, Greer, SC (US); Srikanth Chandrudu Kottilingam, Simpsonville, SC (US); Sandip Dutta, Greenville, SC (US); David Edward Schick, Greenville, SC (US)

(73) Assignee: General Electric Company, Schenectady, NY (US)

( * ) Notice: Subject to any disclaimer, the term of this patent is extended or adjusted under 35 U.S.C. 154(b) by 312 days.

(21) Appl. No.: 14/688,436

(22) Filed: Apr. 16, 2015

(65) Prior Publication Data

US 2016/0303656 A1    Oct. 20, 2016

(51) Int. Cl.
*B22F 3/105* (2006.01)
*B22F 5/10* (2006.01)
(Continued)

(52) U.S. Cl.
CPC ............. *B22F 3/1055* (2013.01); *B22F 5/10* (2013.01); *B23K 26/34* (2013.01); *B23K 26/342* (2015.10); *B22F 5/009* (2013.01); *B22F 5/04* (2013.01); *B22F 2005/005* (2013.01); *B22F 2998/10* (2013.01); *B33Y 10/00* (2014.12); *B33Y 80/00* (2014.12); *Y02P 10/295* (2015.11)

(58) Field of Classification Search
CPC .. B22F 3/1055; B22F 5/10; B22F 5/04; B22F 2005/005; B22F 5/009; B23K 26/342; B23K 26/34; Y02P 10/295; B33Y 10/00; B33Y 80/00
See application file for complete search history.

(56) References Cited

U.S. PATENT DOCUMENTS

| 4,312,624 A | 1/1982 | Steinbauer, Jr. et al. |
| 5,207,556 A | 5/1993 | Frederick et al. |

(Continued)

FOREIGN PATENT DOCUMENTS

| EP | 0 182 588 A1 | 5/1986 |
| EP | 0 599 055 A1 | 6/1994 |

(Continued)

OTHER PUBLICATIONS

U.S. Appl. No. 14/847,347, filed Sep. 8, 2015, Lacy et al.

(Continued)

*Primary Examiner* — Anthony J Zimmer
(74) *Attorney, Agent, or Firm* — McNees Wallace & Nurick LLC

(57) ABSTRACT

Provided are an article and a method of forming an article. The method includes providing a metallic powder, heating the metallic powder to a temperature sufficient to joint at least a portion of the metallic powder to form an initial layer, sequentially forming additional layers in a build direction by providing a distributed layer of the metallic powder over the initial layer and heating the distributed layer of the metallic powder, repeating the steps of sequentially forming the additional layers in the build direction to form a portion of the article having a hollow space formed in the build direction, and forming an overhang feature extending into the hollow space. The article includes an article formed by the method described herein.

19 Claims, 4 Drawing Sheets

(51) Int. Cl.
    *B23K 26/34* (2014.01)
    *B23K 26/342* (2014.01)
    *B22F 5/00* (2006.01)
    *B22F 5/04* (2006.01)
    *B33Y 10/00* (2015.01)
    *B33Y 80/00* (2015.01)

(56) References Cited

U.S. PATENT DOCUMENTS

| | | | |
|---|---|---|---|
| 5,464,322 | A | 11/1995 | Cunha et al. |
| 5,772,398 | A | 6/1998 | Noiret et al. |
| 6,000,908 | A | 12/1999 | Bunker |
| 6,237,344 | B1 | 5/2001 | Lee |
| 6,391,251 | B1 | 5/2002 | Keicher et al. |
| 7,246,993 | B2 | 7/2007 | Bolms et al. |
| 7,789,125 | B2 | 9/2010 | Mayer et al. |
| 8,127,552 | B2 | 3/2012 | Schumacher et al. |
| 8,137,056 | B2 | 3/2012 | Fujimoto et al. |
| 8,152,468 | B2 | 4/2012 | Propheter-Hinckley et al. |
| 8,444,376 | B2 | 5/2013 | Krueckels et al. |
| 2004/0226701 | A1 | 11/2004 | Lomax, Jr. et al. |
| 2007/0169992 | A1 | 7/2007 | Wasif et al. |
| 2009/0324385 | A1 | 12/2009 | Liang |
| 2010/0124485 | A1 | 5/2010 | Tibbott |
| 2011/0123351 | A1 | 5/2011 | Hada et al. |
| 2013/0081401 | A1 | 4/2013 | Kim |
| 2013/0156549 | A1 | 6/2013 | Maldonado |
| 2014/0064913 | A1 | 3/2014 | Adavikolanu et al. |
| 2014/0093379 | A1 | 4/2014 | Tibbott et al. |
| 2014/0093392 | A1 | 4/2014 | Tibbott et al. |
| 2014/0099476 | A1 | 4/2014 | Subramanian et al. |

FOREIGN PATENT DOCUMENTS

| | | |
|---|---|---|
| EP | 0 698 725 A2 | 2/1996 |
| EP | 0 887 515 A1 | 12/1998 |
| EP | 2 256 297 B1 | 12/2010 |
| EP | 2 369 235 A2 | 9/2011 |
| EP | 2 708 296 A2 | 3/2014 |
| EP | 2 716 868 A2 | 4/2014 |
| EP | 2 853 323 A2 | 4/2015 |
| GB | 2 492 374 A | 1/2013 |
| JP | 2011-089461 A | 5/2011 |
| JP | 2012-202342 A | 10/2012 |
| WO | 03/062607 A1 | 7/2003 |
| WO | 2013/160198 A1 | 10/2013 |
| WO | 2015/042009 A1 | 3/2015 |
| WO | 2015/112384 A1 | 7/2015 |

OTHER PUBLICATIONS

U.S. Appl. No. 14/725,374, filed May 29, 2015, Lacy et al.
U.S. Appl. No. 14/847,445, filed Sep. 9, 2015, Lacy et al.
Extended European Search Report and Opinion issued in connection with related EP Application No. 16185770.1 dated Jan. 5, 2017.
Extended European Search Report and Opinion issued in connection with related EP Application No. 16187171.0 dated Apr. 13, 2017.
Extended European Search Report and Opinion issued in connection with related EP Application No. 16187452.4 dated Apr. 13, 2017.
Non-Final Rejection towards related U.S. Appl. No. 14/847,409 dated May 8, 2017.
Extended European Search Report and Opinion issued in connection with corresponding EP Application No. 16164625.2 dated Aug. 29, 2016.
Extended European Search Report and Opinion issued in connection with related EP Application No. 16169984.8 dated Sep. 27, 2016.

ARTICLE AND METHOD OF FORMING AN ARTICLE

STATEMENT REGARDING FEDERALLY SPONSORED RESEARCH

This invention was made with government support under contract number DE-FC26-05NT42643 awarded by the Department of Energy. The government has certain right in this invention.

FIELD OF THE INVENTION

The present invention relates generally to an article and a method of forming an article. More specifically, the present invention is directed to an article having cooling features and a method of forming an article having cooling features.

BACKGROUND OF THE INVENTION

Turbine systems are continuously being modified to increase efficiency and decrease cost. One method for increasing the efficiency of a turbine system includes increasing the operating temperature of the turbine system and/or reducing cooling flows. To increase the temperature or reduce cooling, the turbine system must be constructed of materials which can withstand such temperatures during continued use.

In addition to modifying component materials and coatings, one common method of increasing temperature capability of a turbine component includes the use of cooling features, such as cooling channels and cooling holes. The cooling channels/holes are often formed in metals and alloys used in high temperature regions of gas turbines. One current method of forming the cooling channels includes costly drilling, such as with a laser or waterjet. Another method of forming the cooling channels includes costly electrical discharge machining.

With drilling and electrical discharge machining, the cooling channels can be difficult or impossible to form, resulting in increased scrap, which aids in driving up costs. As an alternative, direct metal laser melting (DMLM) or other additive manufacturing techniques are being considered for the formation of the cooling channels and/or cooling holes. While additive manufacturing can provide increased control over the formation of cooling channels in horizontal builds, it is difficult to control the shape of cooling channels/holes in vertical builds using additive manufacturing. In particular, it is difficult to control the closing of the channel/hole when build direction vector is in the same plane as the cross section of the channel/hole.

An article and a method of forming an article that show one or more improvements in comparison to the prior art would be desirable in the art.

SUMMARY OF THE INVENTION

In one embodiment, a method of forming an article includes providing a metallic powder, heating the metallic powder to a temperature sufficient to joint at least a portion of the metallic powder to form an initial layer, sequentially forming additional layers in a build direction by providing a distributed layer of the metallic powder over the initial layer and heating the distributed layer of the metallic powder to a temperature sufficient to join at least a portion of the distributed layer of the metallic powder and join the formed additional layers to underlying layers, repeating the steps of sequentially forming the additional layers in the build direction to form a portion of the article having a hollow space formed in the build direction, and forming an overhang feature extending into the hollow space.

In another embodiment, a method of forming an article includes depositing a metallic powder over a surface, melting the metallic powder with a focused energy source, the melting of the metallic powder forming an initial layer, sequentially forming additional layers in a build direction by depositing a distributed layer of the metallic powder over an underlying layer, and melting the distributed layer with the focused energy source to join at least a portion of the distributed layer and join the formed additional layers to the underlying layer, the sequentially forming the additional layers forming a portion of the article having a hollow space formed in the build direction, and forming an overhang feature extending into the hollow space.

In another embodiment, an article includes the article formed by the method of forming an article described herein.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are an article and a method of forming an article. Embodiments of the present disclosure, for example, in comparison to concepts failing to include one or more of the features disclosed herein, increase cooling hole surface area, increase a heat transfer coefficient of a cooling hole, increase cooling hole heat transfer, increase manufacturing efficiency, increase cooling hole uniformity, increase cooling hole surface area, provide substantially symmetrical cooling holes from additive manufacturing, increase control of cooling hole geometry during vertical builds using additive manufacturing, decrease cooling hole machining after formation, decrease material waste, or a combination thereof.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Systems used to generate power include, but are not limited to, gas turbines, steam turbines, and other turbine assemblies such as land based aero-derivatives used for power generation. In certain applications, the power generation systems, including the turbomachinery therein (e.g., turbines, compressors, and pumps) and other machinery may include articles that are exposed to heavy wear conditions. For example, the articles may include certain power generation system components, such as blades, buckets, casings, rotor wheels, shafts, shrouds, nozzles, and so forth, may operate in high heat and high revolution environments. These components may include apertures, openings, and/or hollow spaces that form cooling holes therein. The present disclosure provides methods to form these articles and the cooling holes therein.

Figure 1:
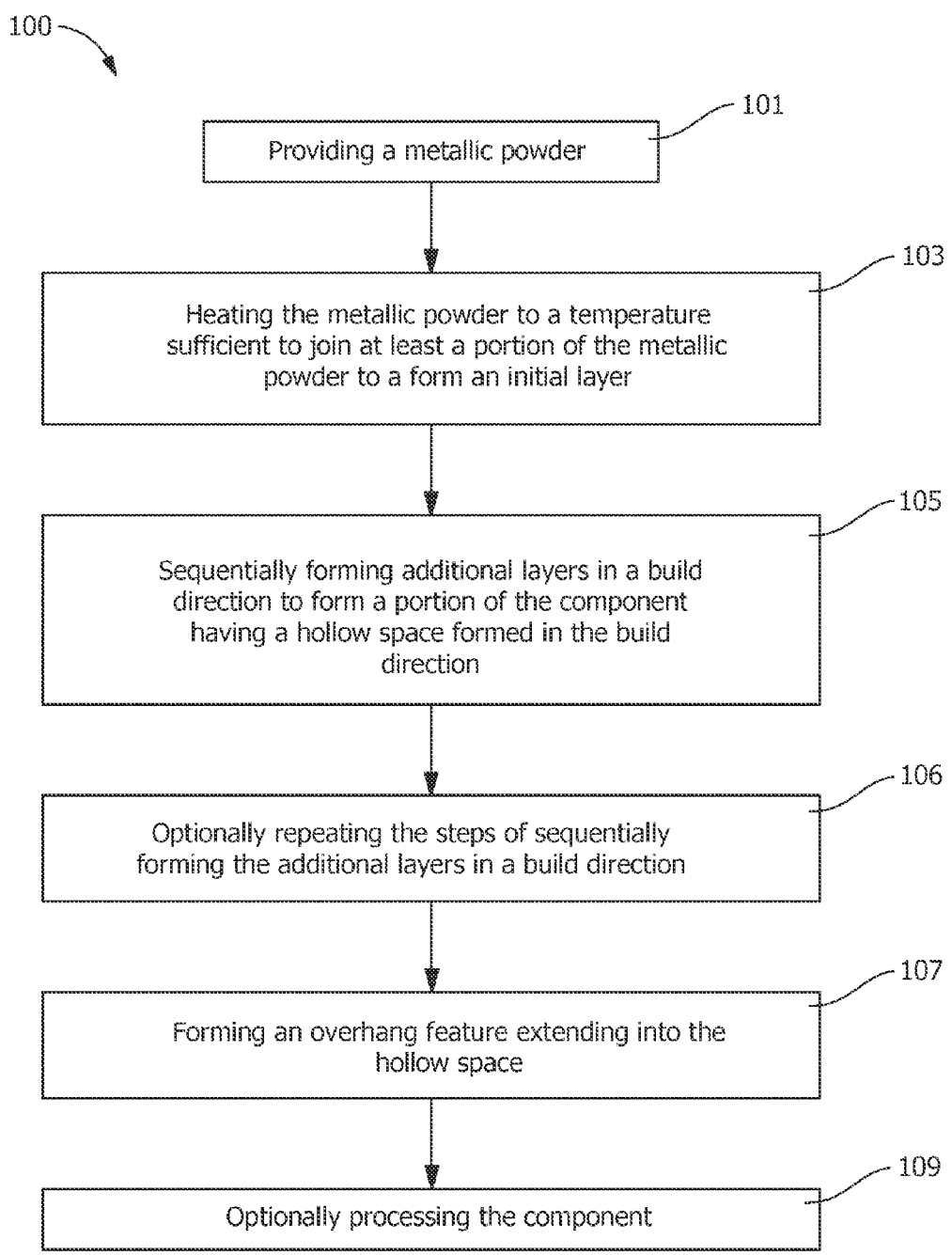
FIG. 1 is a flow chart of a method for fabricating an article.
Figure 2:
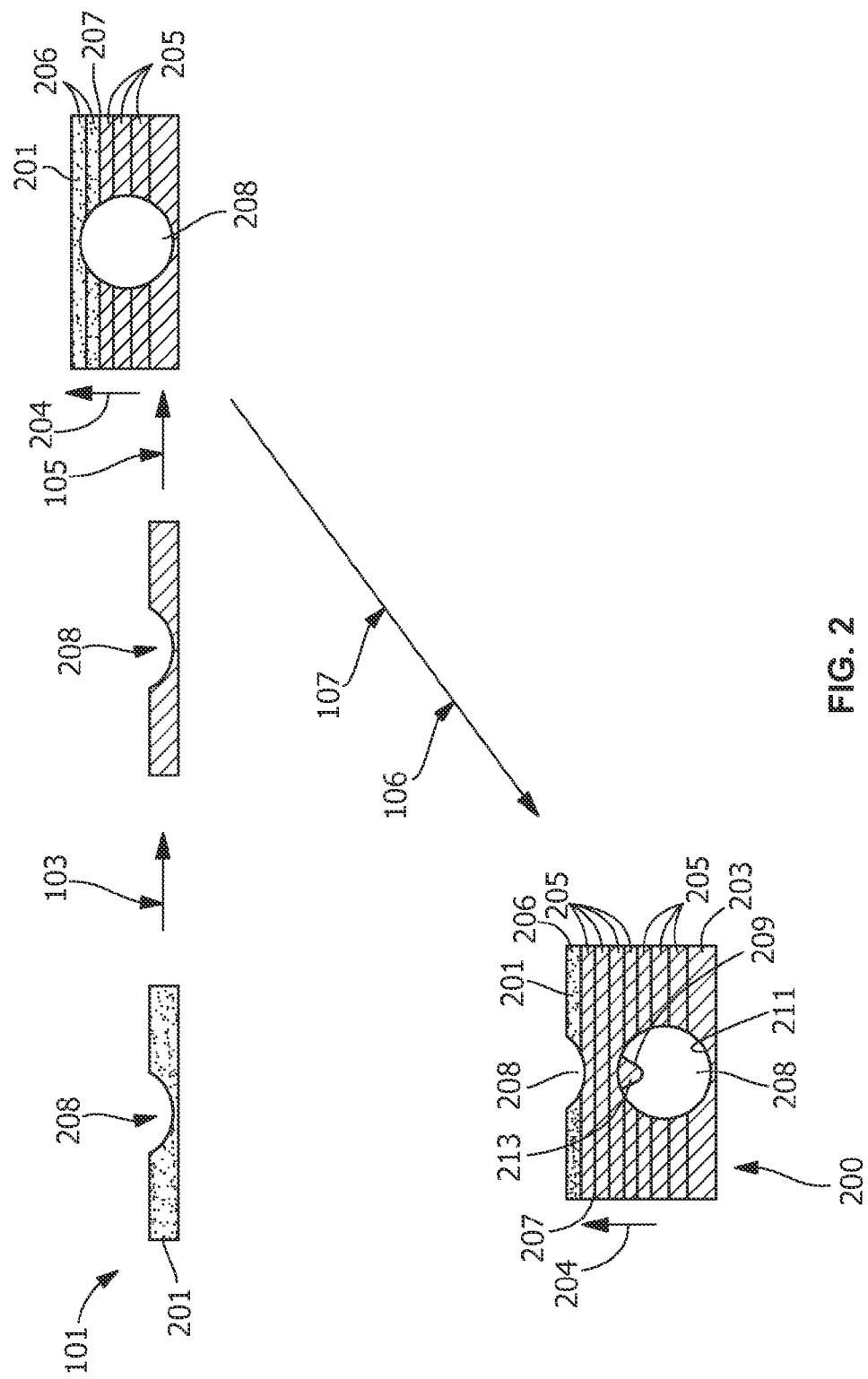
FIG. 2 is a process view of a method for fabricating an article, according to an embodiment of the disclosure.
Figure 3:
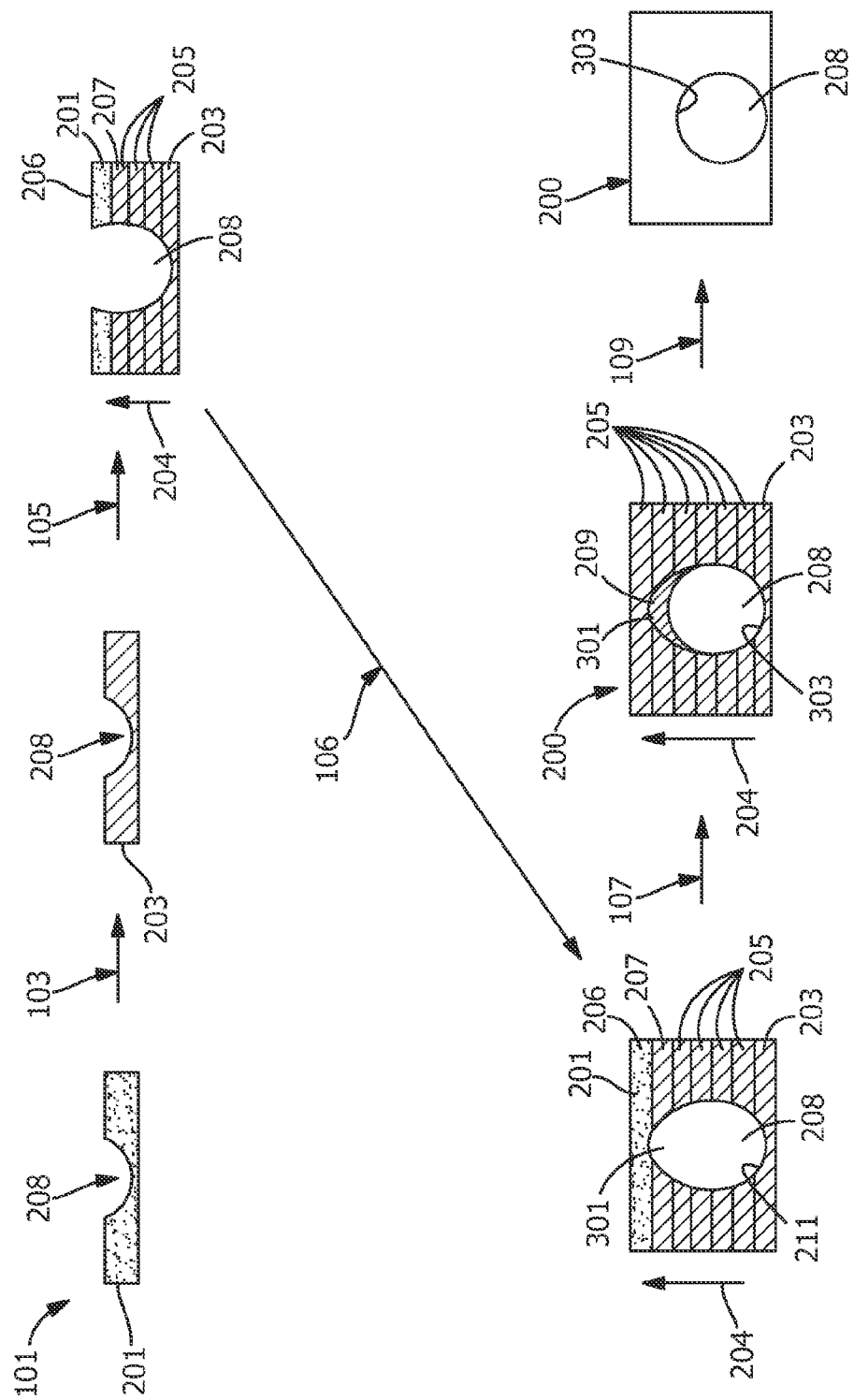
FIG. 3 is a process view of a method for fabricating an article, according to an embodiment of the disclosure.

Referring to FIGS. 1-3, in one embodiment, a method 100 for forming an article 200 includes an additive method. Additive methods include any manufacturing method for making and/or forming net or near-net shape structures. As used herein, the phrase "near-net" refers to a structure, such as the article 200, being formed with a geometry and size very similar to the final geometry and size of the structure, requiring little or no machining and processing after the additive method. As used herein, the phrase "net" refers to the structure being formed with a geometry and size requiring no machining and processing. The structure formed by the additive manufacturing method includes any suitable geometry, such as, but not limited to, square, rectangular, triangular, circular, semi-circular, oval, trapezoidal, octagonal, pyramidal, geometrical shapes having features formed therein, any other geometrical shape, or a combination thereof. For example, the additive method may include forming cooling features, such as one or more apertures, openings, hollow spaces, or other cooling holes, in the article 200.

Suitable additive manufacturing methods include, but are not limited to, the processes known to those of ordinary skill in the art as Direct Metal Laser Melting (DMLM), Direct Metal Laser Sintering (DMLS), Laser Engineered Net Shaping (LENS), Selective Laser Sintering (SLS), Selective Laser Melting (SLM), Electron Beam Melting (EBM), Fused Deposition Modeling (FDM), or a combination thereof.

As illustrated in FIGS. 1-3, in one embodiment, the method 100 for forming the article 200 includes providing a metallic powder 201 (step 101), heating the metallic powder 201 (step 103) to a temperature sufficient to join at least a portion of the metallic powder 201 to form an initial layer 203, sequentially forming additional layers 205 (step 105) in a build direction 204 to form a portion of the article 200 having a hollow space 208 formed in the build direction 204, and forming an overhang feature 209 (step 107) extending into the hollow space 208. In another embodiment, the method 100 includes repeating (step 106) the steps of sequentially forming the additional layers 205 in the build direction 204 to form the portion of the article 200 having the hollow space 208 formed therein. In a further embodiment, the build direction 204 is vertical or substantially vertical as compared to the direction of gravity.

Referring to FIGS. 2-3, the sequentially forming the additional layers 205 (step 105) includes providing a distributed layer 206 of the metallic powder 201 over an underlying layer 207, and heating the distributed layer 206 to a temperature sufficient to join at least a portion of the distributed layer 206 and/or join the formed additional layer 205 to the underlying layer 207. The underlying layer 207 includes any previously formed layer upon which the distributed layer 206 is deposited, such as, but not limited to, the initial layer 203 and/or any other additional layer(s) 205 directly or indirectly joined to the initial layer 203.

In one embodiment, the heating of the metallic powder 201 (step 103) includes, but is not limited to, melting the metallic powder 201, sintering at least a portion of the metallic powder 201, welding at least a portion of the metallic powder, or a combination thereof. For example, in another embodiment, the heating the metallic powder 201 (step 103) to a temperature sufficient to join the metallic powder includes controllably directing a focused energy source 210 toward the metallic powder 201. Suitable focused energy sources include, but are not limited to, a laser device, an electron beam device, or a combination thereof. The laser device includes any laser device operating in a power range and travel speed for melting and/or welding the metallic powder 201, such as, but not limited to, a fiber laser, a $CO_2$ laser, or a ND-YAG laser.

Suitable power ranges for the focused energy source 210 include, but are not limited to, between 125 and 500 watts, between 150 and 500 watts, between 150 and 400 watts, or any combination, sub-combination, range, or sub-range thereof. Additionally, the travel speed includes, but is not limited to, between 400 and 1200 mm/sec, between 500 and 1200 mm/sec, between 500 and 1000 mm/sec, or any combination, sub-combination, range, or sub-range thereof. For example, in one embodiment, the focused energy source 210 operates in the power range of between 125 and 500 watts, at the travel speed of between 400 and 1200 mm/sec for one to three contour passes. In another embodiment, the focused energy source 210 includes a hatch spacing of between about 0.08 mm and 0.2 mm.

The parameters of the focused energy source 210 are dependent upon the material and/or orientation of the metallic powder 201 used to form the formed portion 210. In one embodiment, the power and/or travel speed is adjusted based upon a melting temperature of the material in the metallic powder 201. For example, the power and/or travel speed may be increased for materials having comparatively increased melting temperatures. Suitable materials for the metallic powder 201 include any material capable of being joined through additive manufacturing, such as, but not limited to, a metal, a metallic alloy, a superalloy, steel, a stainless steel, a tool steel, nickel, cobalt, chrome, titanium, aluminum, or a combination thereof.

In another embodiment, the power and/or travel speed is adjusted based upon a number of metallic powder layers being joined and/or a thickness of each of the metallic powder layers. For example, the power and/or travel speed may be increased to join multiple layers of the metallic powder 201 and/or layers of the metallic powder 201 having increased thickness, as compared to the power and/or travel speed used to join a single layer of the metallic powder 201 and/or layers of the metallic powder 201 having a comparatively decreased thickness. The initial layer 203 and each of the additional layers 205 includes a thickness in the range of 20-100 µm (0.0008-0.004 inches), 20-80 µm (0.0008-0.0032 inches), 40-60 µm (0.0016-0.0024 inches), or any combination, sub-combination, range, or sub-range thereof. The thickness of the initial layer 203 is equal to or dissimilar from the thickness of each of the additional layers 205, which is maintained or varied for each of the additional layers 205. Based upon the thicknesses of the initial layer 203 and each of the additional layers 205, a thickness of the article 200 includes any suitable thickness in the range of 250-350000 µm (0.010-13.78 inches), 250-200000 (0.010-7.87 inches), 250-50000 µm (0.010-1.97 inches), 250-6350 µm (0.010-0.250 inches), or any combination, sub-combination, range, or sub-range thereof.

In one embodiment, the forming of the overhang feature 209 (step 107) includes controllably directing the focused energy source 210 towards one or more of the distributed layers 206 overlying a top portion of the hollow space 208. As used herein, the term top portion refers to an upper portion of the hollow space 208 as determined with respect to the build direction 204. In another embodiment, controllably directing the focused energy source 210 towards one or more of the distributed layers 206 includes melting or partially melting the metallic powder 201 of the distributed layer(s) 206, transforming the metallic powder 201 into a molten and/or liquid phase. The melted or partially melted metallic powder 201 advances within the hollow space 208, and solidifies to form the overhang feature 209 extending into the hollow space 208. As utilized herein, "overhang feature" is a material forming a feature or protrusion extending into a space due to melting, flow, and/or any other mechanism that results in movement of the material from the location of powder heating prior to solidification or consolidation of the layers.

A geometry and/or orientation of the overhang feature 209 within the hollow space 208 is determined by the parameters of the focused energy source 210. In one embodiment, the parameters of the focused energy source 210 are adjusted to form the overhang feature 209 with any suitable geometry and/or orientation within the hollow space 208. For example, adjusting the power of the focused energy source 210, the travel speed of the focused energy source 210, an angle of the focused energy source 210 with respect to the hollow space 208, a distance of the focused energy source 210 from the distributed layer(s) 206, or a combination thereof, modifies the geometry and/or orientation of the overhang feature 209 formed therefrom. Suitable geometries include, but are not limited to, triangular, pointed, rounded, rhomboid, rectangular, circular, any other geometrical configuration, or a combination thereof.

Figure 5:
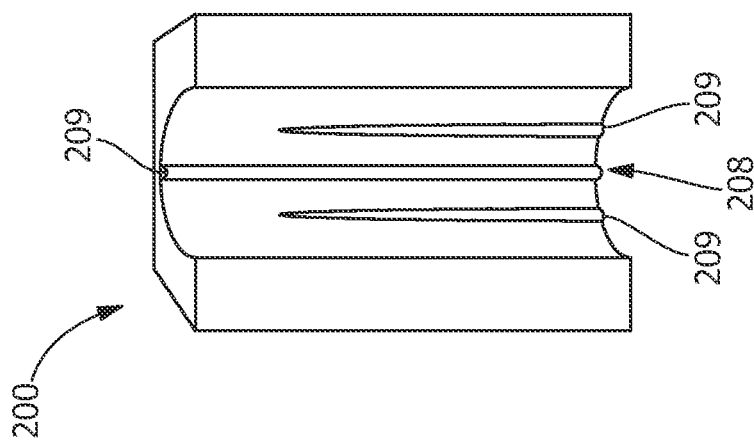
FIG. 5 is a section of a hollow space viewed from below, the section having varying overhang features formed therein, according to an embodiment of the disclosure.
Figure 4:
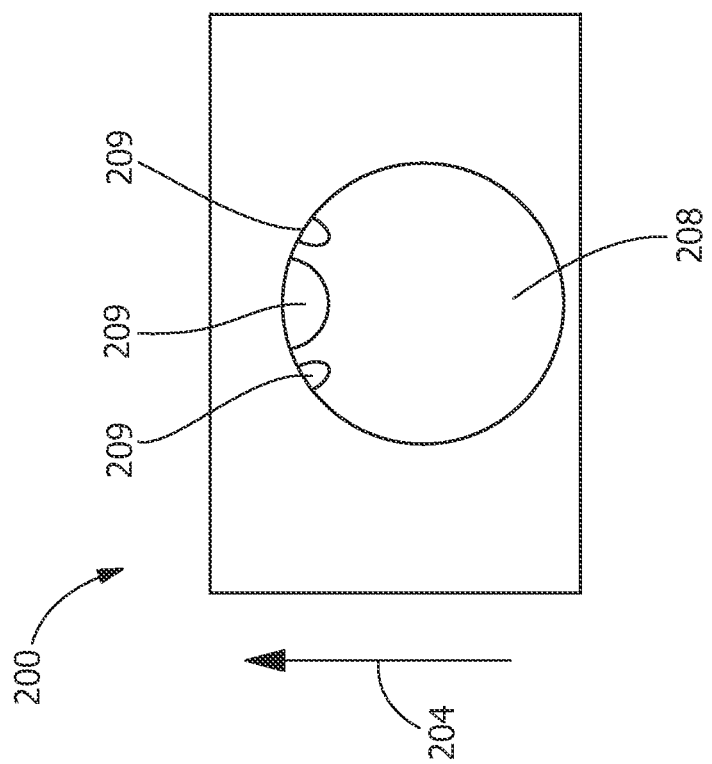
FIG. 4 is an elevational view of a hollow space having multiple overhang features formed therein, according to an embodiment of the disclosure.

Referring to FIG. 4, in one embodiment, more than one of the overhang features 209 are formed within the hollow space 208. In another embodiment, the article 200 includes one or more of the hollow spaces 208, each of the hollow spaces 208 including one or more of the overhang features 209 formed therein. Each of the overhang features 209 extends at least partially along a length of the hollow space 208, and at least partially along a width of the hollow space 208. In a further embodiment, a length, width, and/or geometry of one or more of the overhang features 209 is varied within or between the hollow spaces 208. For example, as illustrated in FIG. 5, the hollow space 208 includes multiple overhang features 209, with at least one of the overhang features 209 including a constant or substantially constant width and/or geometry extending along the entire length of the hollow space 208, and at least one other overhang feature 209 including a varying width and/or geometry extending along a portion of the hollow space 208. As will be understood by those skilled in the art, alternative configurations including any number of overhang features 209 having any suitable combination of lengths, widths, and/or geometries, are contemplated herein.

Referring to FIGS. 2-3, prior to forming the overhang feature 209, the hollow space 208 includes any suitable geometry capable of being formed through additive manufacturing. Suitable geometries include, but are not limited to, circular, substantially circular, ovoid, elliptical, triangular, teardrop, square, rectangular, polygonal, or a combination thereof. Additionally, prior to forming the overhang feature 209, the hollow space 208 may be either symmetrical or non-symmetrical. For example, as illustrated in FIG. 2, the hollow space 208 is circular and symmetrical prior to forming the overhang feature 209. Alternatively, as illustrated in FIG. 3, the hollow space 208 is ovoid and non-symmetrical prior to forming the overhang feature 209.

In one embodiment, as illustrated in FIG. 2, the forming of the overhang feature 209 includes interrupting a perimeter 211 of the hollow space 208, and forming a protrusion 213 extending within the hollow space 208. In another embodiment, the protrusion 213 increases a surface area within the hollow space 208. The increased surface area of the hollow space 208 increases a heat transfer coefficient of the hollow space 208. In a further embodiment, the overhang feature 209 increases the film cooling effectiveness of coolant exiting a cooling passage formed by the hollow space 208. In addition to impingement cooling holes, suitable cooling passages formed by the hollow space 208 include, but are not limited to, film cooling holes, cooling channels, any other cooling aperture, or a combination thereof.

Alternatively, as illustrated in FIG. 3, the forming of the overhang feature 209 includes modifying the perimeter 211 of the hollow space 208 to form a modified perimeter 303 without the protrusion 213 extending within the hollow space 208. In one embodiment, modifying the perimeter 211 includes melting the metallic powder 201 and filling a portion 301 of the hollow space 208 with the overhang feature 209. In another embodiment, the overhang feature 209 extends along a width of the portion 301, and includes a geometry corresponding to a section of the perimeter 211 not covered by the overhang feature 209. The geometry of the melted material is controlled by adjusting the parameters of the focused energy source 210, providing the capability to form the modified perimeter 303 devoid or substantially devoid of the protrusion 211. Together, the overhang feature 209 and the section of the perimeter 211 not covered by the overhang feature 209 form the modified perimeter 303.

In one embodiment, the portion 301 includes a geometry configured to receive the overhang feature 209 without forming the protrusion 213. In another embodiment, the portion 301 includes a portion of the perimeter 211 defining a non-symmetrical geometry, and is configured to receive the overhang feature 209 to form the modified perimeter 303 defining a symmetrical geometry. In a further embodiment, the modified perimeter 303 includes an increased size as compared to cooling passages formed from the hollow space 208 defined by layers of the metallic powder 201 deposited in a substantially circular geometry prior to heating. When used as an impingement hole, the modified perimeter 303 having an increased size provides an impinging jet having an increased perimeter relative to its cross-sectional area, which provides an increased heat transfer coefficient on the impinged upon surface.

Suitable non-symmetrical geometries include, but are not limited to, ovoid, elliptical, teardrop, triangular, or a combination thereof. Suitable symmetrical geometries include, but are not limited to, circular, substantially circular, square, or a combination thereof. As will be understood by those skilled in the art, the perimeter 211 and the modified perimeter 303 are not limited to non-symmetrical and symmetrical geometries, rather, the perimeter 211 and the modified perimeter 303 may include any suitable geometry capable of being formed by additive manufacturing and/or by the forming of the overhang feature 209.

Referring to FIG. 3, in one embodiment, the method 100 may further include processing (step 109) the article 200. Suitable processing steps include, but are not limited to, hot isostatically pressing (HIP'ing) the article 200, solution heat treating (solutionizing) the article 200, or a combination thereof. The HIP'ing includes, after forming the article 200 with the hollow space 208, pressing the article 200 at an elevated temperature and elevated pressure sufficient to further consolidate the article 200. For example, in another embodiment, the article 200 is HIP'd for 3-5 hours at an elevated temperature of between 1149° C. and 1260° C. (2100° F. and 2300° F.), and an elevated pressure of between 68.95 MPa and 137.9 MPa (10,000 PSI and 20,000 PSI). The HIP'ing further consolidates the article 200 to increase the density of the article 200 from, for example, between about 98% and about 99% to between about 99.5% and about 99.8%. The solutionizing includes, after forming the article 200 and/or HIP'ing the article 200, treating the article 200 for 1-2 hours in vacuum at an elevated temperature of between 1093° C. and 1205° C. (2000° F. and 2200° F.). The elevated temperature includes any temperature sufficient for distributing segregated alloying elements within the article 200. It will be recognized by those skilled in the art that HIP'ing temperatures and heat treat temperatures will be highly dependent on the composition of the powders and the desired properties.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

The invention claimed is:

1. A method of forming an article, the method comprising:
    providing a metallic powder;
    heating the metallic powder to a temperature sufficient to join at least a portion of the metallic powder to form an initial layer;
    sequentially forming additional layers in a build direction by providing a distributed layer of the metallic powder over the initial layer and heating the distributed layer of the metallic powder to a temperature sufficient to join at least a portion of the distributed layer of the metallic powder and join the formed additional layers to underlying layers;
    repeating the steps of sequentially forming the additional layers in the build direction to form a portion of the article having a hollow space formed in the build direction; and then
    melting the metallic powder in at least one of the initial and additional layers to form a melted metallic powder such that the melted metallic powder advances within the hollow space and solidifies to form an overhang feature extending into the hollow space.

2. The method of claim 1, wherein the melting to form the overhang feature further comprises modifying a geometry of the hollow space defined by the metallic powder.

3. The method of claim 2, wherein the modifying of the geometry includes filling a portion of the hollow space with the overhang feature.

4. The method of claim 3, wherein filling the portion of the hollow space with the overhang feature forms a symmetrical hollow space.

5. The method of claim 1, further comprising forming a symmetrical hollow space from a non-symmetrical geometry defined by the metallic powder.

6. The method of claim 5, wherein the non-symmetrical geometry is selected from the group consisting of ovoid, elliptical, triangular, teardrop, and combinations thereof.

7. The method of claim 1, wherein the heating the metallic powder comprises directing a focused energy source towards the metallic powder.

8. The method of claim 7, wherein the directing of the focused energy source melts at least a portion of the metallic powder.

9. The method of claim 1, wherein the melting of the metallic powder forms the overhang feature in a direction opposite the build direction.

10. The method of claim 1, wherein the overhang feature interrupts a perimeter of the hollow space.

11. The method of claim 10, wherein the overhang feature increases a surface area within the hollow space.

12. The method of claim 11, wherein the overhang feature increasing a surface area within the hollow space increases a heat transfer coefficient of the hollow space.

13. A method of forming an article, the method comprising:
    depositing a metallic powder over a surface;
    melting the metallic powder with a focused energy source, the melting of the metallic powder forming an initial layer;
    sequentially forming additional layers in a build direction by depositing a distributed layer of the metallic powder over an underlying layer, and melting the distributed layer with the focused energy source to join at least a portion of the distributed layer and join the formed additional layers to the underlying layer, the sequentially forming the additional layers forming a portion of the article having a hollow space formed in the build direction; and then
    heating at least one of the initial and additional layers to form a melted metallic powder such that the melted metallic powder advances within the hollow space and solidifies to form an overhang feature extending into the hollow space.

14. The method of claim 13, wherein the heating at least one of the initial and additional layers comprises directing the focused energy source towards the at least one of the initial and additional layers of the metallic powder overlying the hollow space.

15. The method of claim 14, further comprising forming more than one of the overhang features.

16. The method of claim 15, wherein a geometry of at least one of the more than one of the overhang features differs from a geometry of another of the more than one of the overhang feature.

17. The method of claim 14, further comprising adjusting a parameter of the focused energy source during the directing of the focused energy source towards the at least one of the initial and additional layers of the metallic powder overlying the hollow space, the adjusting of the parameter modifying a geometry of the overhang feature.

18. The method of claim 17, wherein the parameter is selected from the group consisting of power, travel speed, angle, distance, and combinations thereof.

19. The method of claim 17, further comprising forming the portion of the article having more than one hollow space formed in the build direction, each of the more than one hollow spaces including the overhang feature extending therein.

* * * * *